United States Patent [19]

Kang

[11] Patent Number: 4,939,470
[45] Date of Patent: Jul. 3, 1990

[54] CIRCUIT FOR GENERATING DUAL-TONE MULTI-FREQUENCY SIGNALS AND HIGH/LOW-TONE SIGNALS

[75] Inventor: Seo-Won Kang, Suwon, Rep. of Korea

[73] Assignee: Samsung Electronics Co., Ltd., Kyounggi, Rep. of Korea

[21] Appl. No.: 317,757

[22] Filed: Mar. 2, 1989

[30] Foreign Application Priority Data

May 27, 1988 [KR] Rep. of Korea ............... 1988-6252

[51] Int. Cl.$^5$ .................. H04M 1/50; H04M 1/74; H03K 4/92; H03L 7/16
[52] U.S. Cl. .................................. 328/14; 379/361; 340/825.48; 377/56
[58] Field of Search ............... 379/361; 328/14; 340/825.48; 377/56

[56] References Cited

U.S. PATENT DOCUMENTS

| | | | |
|---|---|---|---|
| 3,787,836 | 1/1974 | Hagelbarger | 379/361 |
| 3,820,028 | 6/1974 | Thomas | 379/361 |
| 4,132,871 | 1/1979 | Lake | 379/361 |
| 4,390,754 | 6/1983 | Holberg | 379/361 |
| 4,558,282 | 12/1985 | Lowenschuss | 328/14 |
| 4,727,570 | 2/1988 | Tarbouriech | 328/14 |
| 4,746,870 | 5/1988 | Underhill | 328/14 |

Primary Examiner—John S. Heyman
Attorney, Agent, or Firm—Levy, Bushnell, Zito & Grandinetti

[57] ABSTRACT

A circuit for generating dual-tone multi-frequency (DTMF) signals and high/low-tone signals from digital data with designating frequencies of high-tone or high-frequency group and frequencies of low-tone or low-frequency group, and at least one digital control signal. The circuit includes a signal controlling logic circuit for decoding the digital data in response to the digital control signal, a circuit for generating a fixed clock pulse, a frequency dividing circuit of low-frequency group for generating first clock pulses, a frequency dividing circuit of high-frequency group for generating second clock pulses, first clock device for generating a plurality of pulses having a duty cycle of 50% by dividing the first clock pulses, second clock device for generating a plurality of pulses having a duty cycle of 50% by dividing the second clock pulses, and a signal synthesizing circuit for synthesizing the dual-tone multi-frequency signals or high/low-tone signals of analog sine-wave deprived of higher-harmonic wave component by inputting the clock pulses of the odd frequency.

30 Claims, 6 Drawing Sheets

CIRCUIT FOR GENERATING DUAL-TONE MULTI-FREQUENCY SIGNALS AND HIGH/LOW-TONE SIGNALS

BACKGROUND OF THE INVENTION

The present invention relates to a mobile radio telephone system, and more particularly a circuit for generating dual-tone multi-frequency (DTMF) signals and high/low-tone signals used in an advanced mobile phone system (AMPS).

AMPS employs the DTMF signals and the high/low-tone signals respectively as the end-to-end signals and the side tone signals. The end-to-end signals are automatically transmitted from a mobile vehicle telephone system to a local telephone exchange office or another party through the transmitter in the system. The side tone signal is to inform the user of the state of the vehicle telephone system, which is delivered to the user through a receiving low-frequency terminal, a control means and a handset in the system.

Generally, the keyboard of the AMPS is mounted in the handset. On the keyboard are arranged a few functional keys (for example SEND, END and CLR, etc.) together with the dialing keys. The dialing keys, as in a conventional multi-tone telephone, are arranged in the form of a matrix comprising four rows each designating one frequency of the low-frequency group, namely, 697 Hz (corresponding to the keys 1,2,3), 770 Hz (corresponding to the keys 4,5,6), 852 Hz (corresponding to the keys 7,8,9) and 941 Hz (corresponding to the keys *,0,#), and three columns each designating one frequency of the high-frequency group, namely, 1209 Hz (corresponding to the keys 1,4,7,*), 1336 Hz (corresponding to the keys 2,5,8,0), 1477 Hz (corresponding to the keys 3,6,9,#). When a particular dialing key is put on, the AMPS produces as the end-to-end signal a sine wave signal composed of a particular frequency of the low-frequency group and a particular frequency of the high-frequency group corresponding to the key. This is called the DTMF signal.

On the other hand, when one of the functional keys is put on, a high-tone signal of 1150 Hz is transmitted as the side tone signal to the user. Also, when the AMPS goes during its communication into the area making the communication difficult, or the communication of the AMPS is started, the above high-tone signal and the low-tone signal of 770 Hz are repeatedly generated and delivered to the user. This is accomplished by a circuit for generating the DTMF signal and the high/low-tone signal.

A prior-art circuit for generating the DTMF and high/low-tone signals generates the DTMF signal by using a semiconductor device designed for generating the DTMF tone which has been used in the ordinary telephone system, and uses as the low-tone signal of the high/low-tone signals the low-frequency of 770 Hz of the DTMF signals. Moreover, because the high-tone signal is not generated by the DTMF signal generator, it should be generated by a separate oscillator. However, since most of the commercial DTMF signal generators used in the ordinary telephone must solve the attenuation problem of the high-frequency signal resulting from the long-distance transmission of the DTMF signal through the communication line, the high-frequency group signals of the DTMF signals are emphasized by 2.7 dB(decibels) more than the low-frequency group signal. It is unsuitable to use such a conventional DTMF signal generator in the AMPS in view of the fact that the DTMF peak-frequency-deviation for each frequency component should be limited within 4.5±10% in accordance with the provisions of the AMPS. Furthermore, a separate oscillator for generating the high-tone signal, as described above, is required in addition to the DTMF signal generator.

One of the conventional circuits for generating the DTMF signal to be easily fabricated in a semiconductor chip has used the frequency synthesizing method. Such a DTMF signal generator is disclosed in the U.S. Pat. No. 3,787,836 issued to Hagelbarger et al. on Jan. 12, 1974. According to the circuit dislcosed in the above patent, the frequency of master clock is divided into a fixed digital clock under the control of the keyboard. The train of the divided multi-frequency digital clock are used to make a phase shift into a fixed phase. This phase shifted component is properly synthesized to make a sine-wave signal to the multi-tone. However, in case of using the digital-to-analog synthesizing method has the digital square wave itself an odd higher-harmonic wave component. Consequently, the finally synthesized waveform has to have mentioned higher-harmonic wave component. If such a synthesized DTMF signal is used in the AMPS, transmission errors may occur.

SUMMARY OF THE INVENTION

It is therefore an object of the present invention to provide a circuit for generating the DTMF and high/low-tone signals which are suitable for the AMPS and uses the frequency synthesizing method therein.

It is another object of the present invention to provide a circuit for generating the DTMF and high/low-tone signals capable of eliminating the higher-harmonic wave component.

It is a further object of the present invention to provide a circuit for generating the DTMF and high/low-tone signals which comprise a digital circuit to make the frequency adjustment unnecessary and may be easily formed into an integrated circuit.

According to the present invention, the circuit for generating dual tone multi-frequency signals and high/low-tone signals from the digital data designating the frequencies of high-tone or high-frequency group and low-tone or low-frequency group and the digital control signal, comprises a signal controlling logic circuit for decoding the digital data in response to the digital control signal to thereby generate low-frequency selecting decoding signals for selecting the frequency of the low-frequency group or low-tone, high-frequency selecting decoding signals for selecting the frequency of the high-frequency group or high-tone, a low-frequency group enabling signal and a high-frequency group enabling signal; a circuit for generating fixed clock pulses; a frequency dividing circuit of low-frequency group for generating a first clock pulse having the frequency of a fixed multiple of a particular frequency selected from the low-frequency selecting decoding signal by counting and decoding the clock pulses; a frequency dividing circuit of high-frequency group for generating a second clock pulse having the frequency of a fixed multiple of a particular frequency selected from the high-frequency selecting decoding signal by counting and decoding the clock pulses; a first clock generating means for generating a plurality of pulses having a duty cycle of 50% by dividing the first clock pulses, the clock being enabled by said low-frequency group enabling signal, said pulses each having an odd frequency of a higher harmonic wave; a second clock generating means for generating a plurality of pulses having a duty cycle of 50% by dividing the second clock pulses, the clock being enabled by the high-frequency group enabling signal, the pulses each having an odd frequency of a higher harmonic wave; and a signal synthesizing circuit for synthesizing dual-tone multi-frequency signals or high/low-tone signals of analog sine wave deprived of the higher-harmonic wave component by inputting the clock pulses of an odd frequency.

The AMPS contains a central processing unit comprising a microprocessor. When a dial key or a functional key is put on or the high/low signal is to be transmitted to the user, the central processing unit produces the digital data signal corresponding to each of the cases, and the control signals for operating the circuits for supplying the data signals. The means for generating these digital data signals and control signals may be achieved by those skilled in the art. The circuit according to the present invention operates in response to the data signals and the control signals outputted from the central processing unit to generate the DTMF signal or high/low signal deprived of the odd higher-harmonic waves of a fundamental wave.

The present invention will now be described in more detail with reference to the drawings attached to the specification only by way of example.

DETAILED DESCRIPTION OF THE PREFERRED EMBODIMENT

Figure 1:
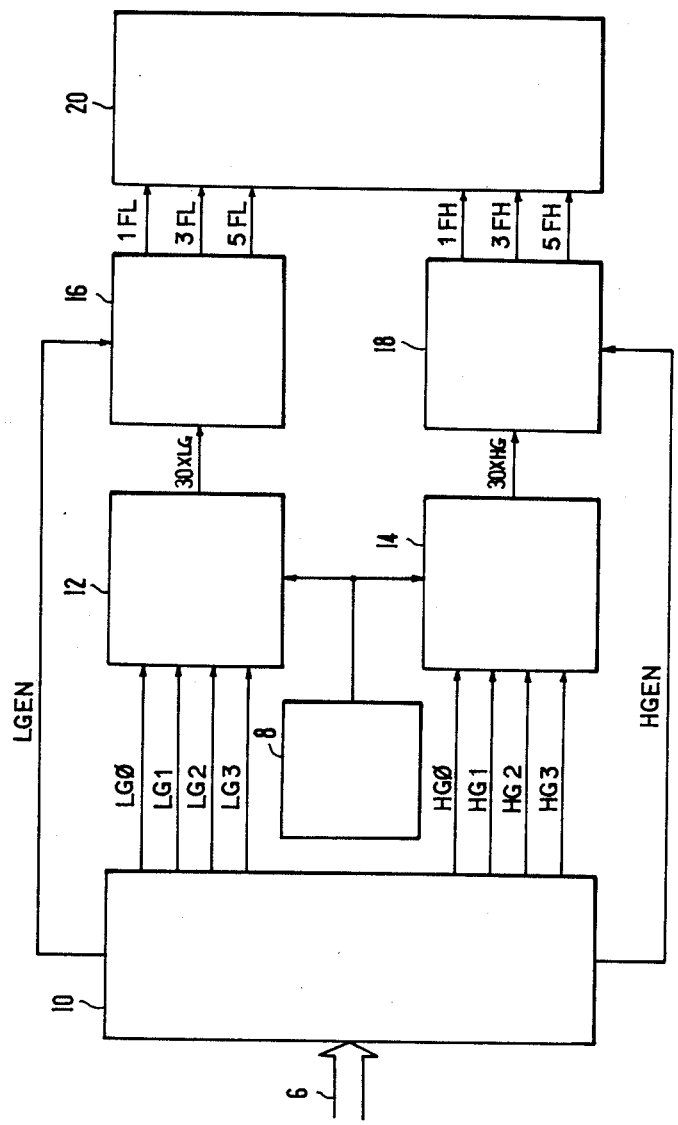
FIG. 1 is a block diagram of the circuit for generating the DTMF signal and high/low-tone signal of the present invention.

Referring to FIG. 1, there is shown a block diagram of a simplified circuit for generating the DTMF signal and high/low-tone signal using the digital-to-analog frequency synthesizing system according to the present invention. The logic circuit for controlling signals 10 receives the data signals and the control signals from the central processing unit through an input bus 6. The data signals address the frequencies of the DTMF or high/low signals, and the control signals control the input of the data signals to the circuit of the present invention and also the enabling or disabling of the inventive circuit. With the input of the data signals and the control signals, the logic circuit 10 for controlling signals decodes the data signals, and generates low-frequency selecting decoding signals LG0-LG3 for selecting the low-frequency group or the low-tone frequency, or high-frequency selecting decoding signals HG0-HG3 for selecting the high-frequency group or the high-tone frequency, and a low-frequency group enabling signal LGEN for enabling the first clock pulse generating circuit 16 and a high-frequency group enabling signal HGEN for enabling the second clock pulse generating circuit 18.

A conventional vehicle telephone system uses a clock of 10.24 MHz as a master clock. A clock pulse generating circuit 8 employs a known circuit to generate a clock pulse obtained by dividing into a fixed value the frequency of the master clock. Because the frequencies of the DTMF and the high/low-tone signals should be kept within 1% of the nominal frequency according to the provisions of the AMPS, it is preferable to use as the output clock pulses of the circuit 8 the clock pulses obtained by dividing the frequency of the master clock, which nearly approaches a common multiple of the odd number of the odd higher-harmonic wave, by the nominal frequency. Therefore, the output clock pulse of 2.56 MHz obtained by dividing by 4 the frequency of the master clock may be used. A frequency dividing circuit 12 of the low-frequency group and another frequency dividing circuit 14 of the high-frequency group respectively respond to the low-frequency selecting decoding signals LG0-LG3 and the high-frequency selecting decoding signals HG0-HG3 so as to count and decode the clock pulses supplied by the clock pulse generating ciruit 8, thereby producing the clock pulse signals 30XLG and 30XHG of a fixed multiple respectively of the low-frequency and the high-frequency selected by the signals LG0-LG3 and HG0-HG3. The fixed multiple is a common multiple of the odd number of the odd higher-harmonic wave. In the preferred embodiment of the present invention, the multiple is selected into a number "30", which to get rid of the third higher-harmonic wave and the fifth higher-harmonic wave.

The first clock pulse generating circuit 16 and the second clock pulse generating circuit 18 respectively respond to the enabling signals LGEN and HGEN so as to divide the frequencies of the clock signals 30XLG and 30XHG, therefrom producing the clock pulses 1FL-5FL and 1FH-5FH which are each a fundamental frequency of the DTMF signal and the high/low-tone signal, a three-times multiple thereof and a five-times multiple thereof. These clock pulses are pulses of the square wave having the duty cycle of 50%. The first and the second clock pulse generating circuits 16 and 18 are all enabled to produce the DTMF signal. In order to generate the high-tone signal the first clock pulse generating circuit 16 is disabled but the second clock pulse generating circuit 18 is enabled, while in order to produce the low-tone signal the first clock pulse generating circuit 16 is enabled and the second clock pulse generating circuit 18 disabled. The signal synthesizing circuit 20 synthesizes the clock pulses received, producing the DTMF signal or the high/low-tone signal of the sine wave without the third and the fifth higher harmonic waves.

FIGS. 2 to 6 specifically illustrate the circuitry of FIG. 1, by way of a preferred embodiment. The same reference numerals indicate the same parts or components in the drawings.

Figure 2:
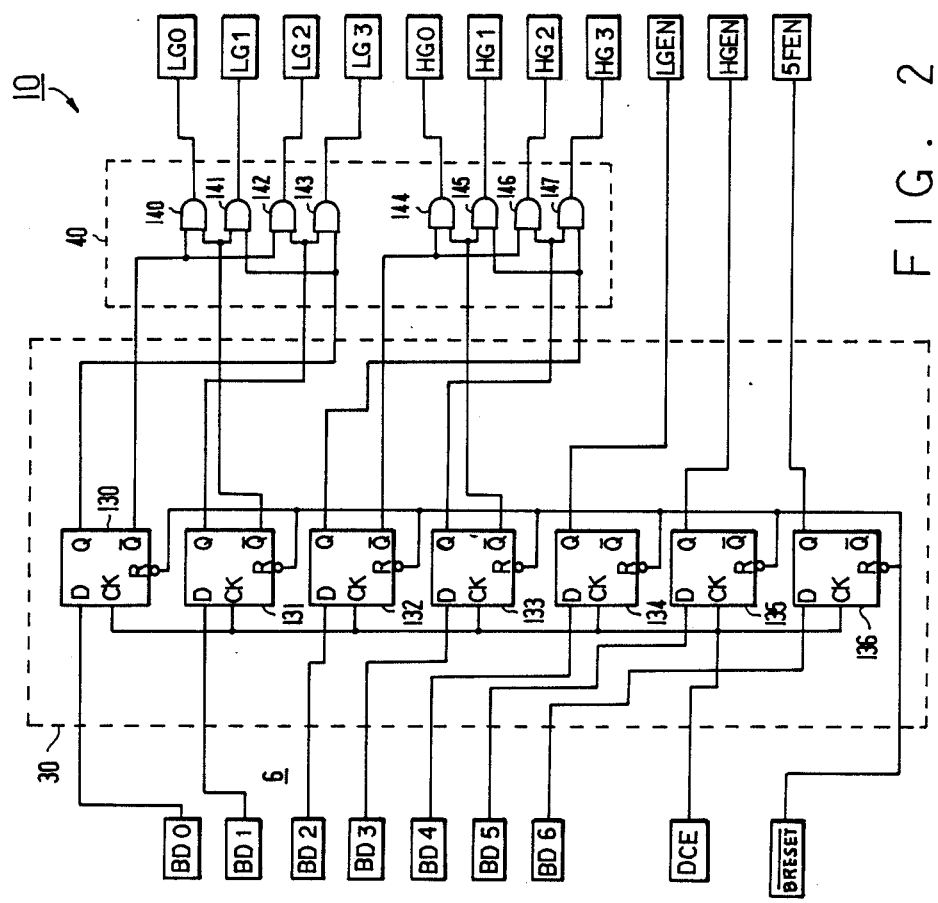
FIG. 2 specifically illustrates a preferred embodiment of the logic circuit for controlling signals of FIG. 1.
Figure 3:
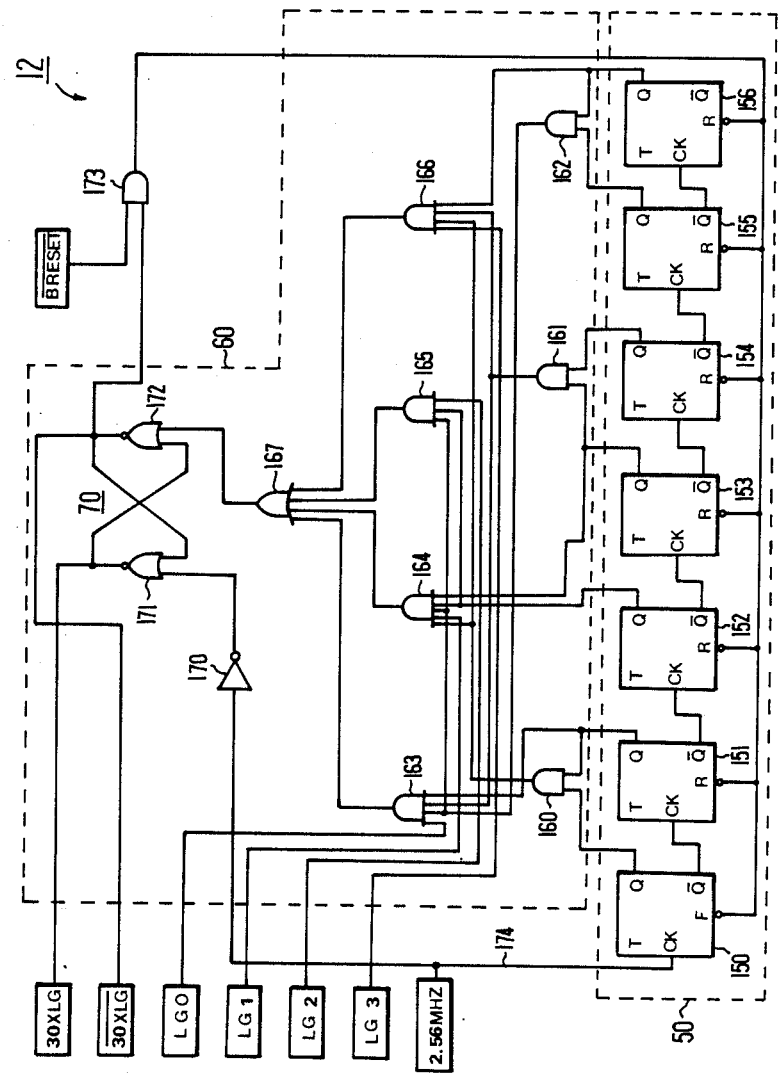
FIG. 3 specifically illustrates a preferred embodiment of the frequency dividing circuit for the low-frequency group of FIG. 1.

FIG. 2 illustrates a specific embodiment of the signal controlling logic circuit 10 in FIG. 1. Reference symbols shown BD0-BD6 indicate the digital data signals, and DCE and BRESET the digital control signals. The data signals BD0 and BD1 are for the low-frequency group to address the low-frequencies corresponding to one of the four rows on the keyboard, the data signals BD2 and BD3 are for the high-frequency group to address the high frequencies corresponding to one of the three columns on the keyboard, the data signals BD4 and BD5 respectively are the low-frequency group and the high-frequency group enabling data signals to each generate the low-frequency group enabling signal LGEN and the high-frequency group enabling signal HGEN, and the data signal BD6 is a higher-harmonic wave generating data signal to generate the fifth higher-harmonic wave control signal 5FEN. The control signal BRESET is a reset signal to inihibit the operation of the inventive circuit, while DCE is a data input control signal to input the data signals BD0-BD6 into the signal controlling logic circuit 10.

abling data signal BD5 and the fifth-higher-harmonic wave data signal BD6 so as to generate the low-frequency-group enabling signal LGEN, the high-frequency-group enabling signal HGEN and the fifth-harmonic wave control signal 5FEN. According to the embodiment of the present invention, when the reset signal BRESET is logic "1" and the data input control signal DCE enters the high state from the low state, there is shown a logic table (TABLE NO. 1) representing the data signals BD0-BD6 for generating the DTMF signal, the high-tone signal HT and the low-tone signal LT corresponding to each of the dialing keys 0 to 9, * and # on the keyboard and the output signals LG0-LG3, HG0-HG3, LGEN, HGEN and 5FEN of the logic control circuit 10, as follows.

TABLE NO. 1

| | | | | | | | | LOGIC STATE | | | | | | | | | | |
|---|---|---|---|---|---|---|---|---|---|---|---|---|---|---|---|---|---|---|
| | | BD0 | BD1 | BD2 | BD3 | BD4 | BD5 | BD6 | LG0 | LG1 | LG2 | LG3 | HG0 | HG1 | HG2 | HG3 | LGEN | HGEN | 5FEN |
| KEY | 1 | 0 | 0 | 1 | 0 | 1 | 1 | 1 | 1 | 0 | 0 | 0 | 0 | 1 | 0 | 0 | 1 | 1 | 1 |
| | 2 | 0 | 0 | 0 | 1 | 1 | 1 | 1 | 1 | 0 | 0 | 0 | 0 | 0 | 1 | 0 | 1 | 1 | 1 |
| | 3 | 0 | 0 | 1 | 1 | 1 | 1 | 1 | 1 | 0 | 0 | 0 | 0 | 0 | 0 | 1 | 1 | 1 | 1 |
| | 4 | 1 | 0 | 1 | 0 | 1 | 1 | 1 | 0 | 1 | 0 | 0 | 0 | 1 | 0 | 0 | 1 | 1 | 1 |
| | 5 | 1 | 0 | 0 | 1 | 1 | 1 | 1 | 0 | 1 | 0 | 0 | 0 | 0 | 1 | 0 | 1 | 1 | 1 |
| | 6 | 1 | 0 | 1 | 1 | 1 | 1 | 1 | 0 | 1 | 0 | 0 | 0 | 0 | 0 | 1 | 1 | 1 | 1 |
| | 7 | 0 | 1 | 1 | 0 | 1 | 1 | 1 | 0 | 0 | 1 | 0 | 0 | 1 | 0 | 0 | 1 | 1 | 1 |
| | 8 | 0 | 1 | 0 | 1 | 1 | 1 | 1 | 0 | 0 | 1 | 0 | 0 | 0 | 1 | 0 | 1 | 1 | 1 |
| | 9 | 0 | 1 | 1 | 1 | 1 | 1 | 1 | 0 | 0 | 1 | 0 | 0 | 0 | 0 | 1 | 1 | 1 | 1 |
| | * | 1 | 1 | 1 | 0 | 1 | 1 | 1 | 0 | 0 | 0 | 1 | 0 | 1 | 0 | 0 | 1 | 1 | 1 |
| | 0 | 1 | 1 | 0 | 1 | 1 | 1 | 1 | 0 | 0 | 0 | 1 | 0 | 0 | 1 | 0 | 1 | 1 | 1 |
| | # | 1 | 1 | 1 | 1 | 1 | 1 | 1 | 0 | 0 | 0 | 1 | 0 | 0 | 0 | 1 | 1 | 1 | 1 |
| | HT | 0 | 0 | 0 | 0 | 0 | 1 | 1 | 0 | 1 | 0 | 0 | 1 | 0 | 0 | 0 | 0 | 1 | 1 |
| | LT | 1 | 0 | 0 | 0 | 1 | 0 | 1 | 0 | 1 | 0 | 0 | 1 | 0 | 0 | 0 | 1 | 0 | 1 |

The signal controlling logic circuit 10 comprises a register 30 and a decoder 40 as shown by the dotted blocks in FIG. 2. The register 30 comprises the D-type flip-flops 130-136. With the data input terminals D of the flip-flops 130-136 the data signals BD0-BD6 are respectively connected. The clock pulse input terminals CK are all connected with the data input control signal DCE to control the data input timing. The reset signal BRESET is connected with reset input terminals R to reset the flip-flops 130-136. Hence, the flip-flops 130-136 receive the data signals BD0-BD6 and store them when the reset signal BRESET is logic high level and the data input control signal DCE enters into logic high state from logic low state. The output terminal Q and the inverted output terminal Q of the flip-flop 130 are respectively connected with the input terminals of the AND gates 143 and 141, and the input terminals of the AND gates 140 and 142, while the output terminal Q and the inverted output terminal Q of the flip-flop 131 are respectively connected with the other input terminals of the AND gates 142 and 143, and the other input terminals of the AND gates 140 and 141. The flip-flops 132 and 133 are also connected with the AND gates 144-147 as the flip-flops 130-131 are connected with the AND gates 140-143. Thus, the AND gates 140-143 and 144-147 decode respectively the low-frequency group data signals BD0 and BD1 and the high-frequency group data signals BD2 and BD3 through flip-flops 130,131 and 132,133 to generate the low-frequency-group selecting decoding signals LG0-LG3 and the high-frequency-group selecting decoding signals HG0-HG3. When the input control signal DCE enters the high state from the low state, the flip-flops 134, 135 and 136 respectively receive the low-frequency-group enabling data signal BD4, the high-frequency-group en- FIG. 3 specifically illustrates the frequency dividing circuit 12 of the low-frequency group in FIG. 1. The frequency dividing circuit 12 of the low-frequency group, as shown by the blocks indicated by dotted lines in FIG. 3, comprises a counter 50 for generating a clock pulse by dividing by two the frequency of 2.56 MHz clock pulse, a first decoding circuit 60 for decoding the output clock pulses out of the counter 50 in response to the low-frequency selecting decoding signals LG0-LG3 from the signal controlling logic circuit 10 and for generating clock pulses at one frequency of the low-frequency group or at a 30-times period, as much as 30 time the period of the low-tone frequency, and a gate 173 for resetting the counter 50 in response to the clock pulses from the decoding circuit 60.

The counter 50 comprises an asynchronous 7-stage binary counter using T-type flip-flops 150-156. The T-type flip-flops 150-156 are connected with each other in such a way that an inverted output terminal Q of a preceding flip-flop is coupled to a clock input terminal CK of a next T-type flip-flop. The clock input terminal CK of the first stage T-type flip-flop 150 is connected through a conducting line 174 to the 2.56 MHz clock having the duty cycle of 50% from the clock pulse generating circuit 8. Hence, each output terminal Q of the T-type flip-flops 150-156 produces an output signal of the clock pulses obtained by dividing by two the 2.56 MHz clock, in sequence.

The first decoding circuit 60 comprises AND gates 160-166, OR gate 167, NOR gates 171, 172 and inverter 170. The outputs of the flip-flops 150 and 151 are supplied to the two-input AND gate 160 whose output is supplied to the AND gates 164 and 166. The two-input AND gate 161 receives the outputs of the flip-flops 153 and 154, and produces the output to the AND gates 163 and 166. Also, the two-input AND gate 162 receives the outputs of the flip-flops 155 and 156, and produces the output to the AND gate 163. The AND gate 163 further receives the low-frequency selecting decoding signal LG0 and the output of the flip-flop 151, the AND gate 164 receives the low-frequency selecting decoding signal LG1 and the outputs of the flip-flops 152, 153, the AND gate 165 receives the low-frequency selecting decoding signal LG2 and the output of the flip-flop 152, and then the AND gate 166 receives the low-frequency selecting decoding signal LG3 and the output of the flip-flop 156. The four-input OR gate 167 receives the outputs of the AND gates 163–166. The inputs and the outputs of the NOR gates 171 and 172 are cross-connected with each other to form a flip-flop. The other input of the NOR gate 172 is connected with the output of the OR gate 167, while the other input of the NOR gate 171 is connected with the master clock of 2.56 MHz through the inverter 170. The two-input AND gate 173 receives the output of the NOR gate 172 and the reset signal BRESET and delivers its output to the reset terminals R of the flip-flops 150–156.

As indicated in Table 1, when either key 1,2 or 3 is put on (namely, LGO="1" LG1-LG3 are all in "0" (zero) state) and a 122nd clock pulse counted from the start of the 2.56 MHz clock enters the high state from the low state, the AND gate 163 generates a high-state pulse, and the AND gates 164–166 all generate low-state pulses. Consequently, the output of the OR gate 167 becomes the output of the AND gate 163. Likewise, when the key 4,5 or 6 is put on, or the data signal for generating the low-tone signal is inputted (namely, when the LG1 is only in "1" state) and a 111th clock pulse of the master clock enters the high state, the OR gate 167 generates the high state pulse. When the key 7,8 or 9 is put on (namely, when only the LG2 is in "1" state) and 100th clock pulse of the 2.56 MHz clock is inputted, the OR gate 167 generates the high state pulse. Further, if the key *,0 or # is put on (namely, when only the LG3 is in the 1 state) and the 91st clock pulse of the 2.56 MHz clock is inputted, the OR gate 167 generates the high state pulses.

In the flip-flop 70 comprising the NOR gates 171 and 172, the outputs of the NOR gates 171 and 172 are maintained respectively in the low and the high states by the 2.56 MHz clock pulses through the inverter 170, if the output of the OR gate 167 is maintained in the low state. However, if the output of the OR gate 167 is in the high state, the output of the NOR gate 172 is in the low state, which causes the output of the NOR gate 171 to be in the high state by the 2.56 MHz clock through the inverter 170. The low-state output of the NOR gate 172 resets the counter 50 through the AND gate 173, and the output of the OR gate 167 switches to the low state. Hence, when the 2.56 MHz clock pulse through the inverter 170 enters the high state from the low state, the output of the NOR gate 171 switches the low state which, together with the low-state output of the OR gate 167, causes the output of the NOR gate 172 to be in the high state and the output of the NOR gate 171 to be in the low state. The high-state output of the NOR gate 172 sets the counter 50 through the AND gate 173, and the above operation is repeated. Therefore, the output signal 30XLG of the NOR gate 171 cause the clock pulse to be in the high state for 0.2-μsec at every period which is 30 times as long as the period of a frequency of the low-frequency group or the low-tone frequency selected by the input of the low-frequency selecting decoding signals LG0-LG3. The output signal $\overline{30XLG}$ of the NOR gate 172 is the inverting of the output signal 30XLG.

Figure 4:
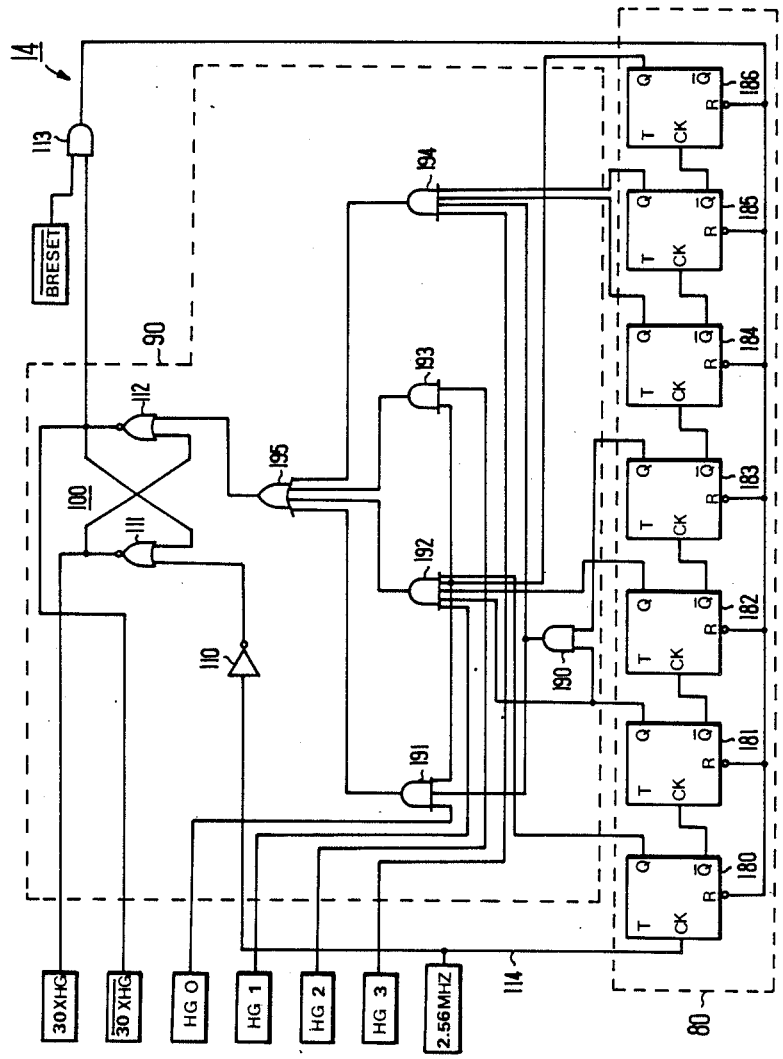
FIG. 4 specifically illustrates a preferred embodiment of the frequency dividing circuit for the high-frequency group of FIG. 1.

FIG. 4 specifically illustrates the frequency dividing circuit 14 of the high-frequency group in FIG. 1. The frequency dividing circuit 14 of the high-frequency group has the same construction as that of the counter 50 of FIG. 3, and has a 7-stage binary counter 80 of the T-type flip-flops 180–186 connected in series with each other to produce the clock pulses obtained by dividing by two the frequency of the 2.56 MHz clock pulses at every stage, a second decoding circuit 90 for receiving the frequency divided clock pulses of the counter 80 to produce a clock pulse with a period which is about 30 times as much as the period of the high-tone frequency or one frequency of the high-frequency group selected according to the logic state of the high-frequency selecting decoding signals HG0-HG3, and a gate 113 for resetting the counter 80 in response to the reset clock pulse BRESET or the clock pulse of the second decoding circuit 90, thereby producing the clock pulses at every period which is 30 times as much as the period of said selected frequency.

The two-input AND gate 190 receives the Q output of the second stage T-type flip-flop 181 and the Q output of the fourth stage T-type flip-flop 183. If the three input AND gate 191 receives the data signal for generating the high-tone (when HGO="1"), it generates a high-state pulse upon the input of the 74th clock pulse of the 2.56 MHz counted from the start of the counter 80 together with inputting the output clock pulses of the AND gate 190 and the Q output clock pulses of the seventh stage flip-flop 186. The four-input AND gate 192 generates a high-state pulse upon the input of the 71st clock pulse of the 2.56 MHz clock pulses together with inputting the Q output clock pulses of first, second, third and seventh stage flip-flops 180, 181, 182 and 186, if either one key 1,4,7 or * is put on (when HG1="1"). If the key 2,5,8 or 0 is put on (when HG2="1"), the two-input AND gate 193 generates the high-state pulse at the input of the 64th pulse of the 2.56 MHz clock pulse together with the clock pulses of the seventh stage flip-flop 186. If the key 3,6,9 or # is put on (when HG3="1"), the four-input AND gate 194 generates the high-state pulse at the input of the 58th clock pulse of the 2.56 MHz clock pulse together with the output of the AND gate 190 and the Q output clock pulses of the flip-flops 184 and 185. The four-input OR gate 195 is connected with the outputs of the AND gates 191–194 which are supplied to the NOR gate 112. The inputs and outputs of the NOR gates 112 and 111 are cross-connected with each other to form a flip-flop 100, and the other input of the NOR gate 111 is connected with the 2.56 MHz clock pulse. The two-input AND gate 113 is supplied with the reset signal BRESET and the output signal of the NOR gate 112, and is connected with the reset terminals R of the counter 80 to supply a signal for resetting the counter 80. The operation of the flip-flop 100 is similar to that of the flip-flop 70. Therefore, the output signal 30XHG of the NOR gate 111 of the flip-flop 100 is the clock pulse which is in the high state for a 0.2-μsec duration at every period which is about 30 times as long as the period of a frequency of the high-frequency group or the high-tone frequency selected by the input of the high-frequency selecting decoding signal HG0-HG3. The output signal $\overline{30XHG}$ of the NOR gate 112 is the inverted signal of the signal 30XHG.

Figure 5:
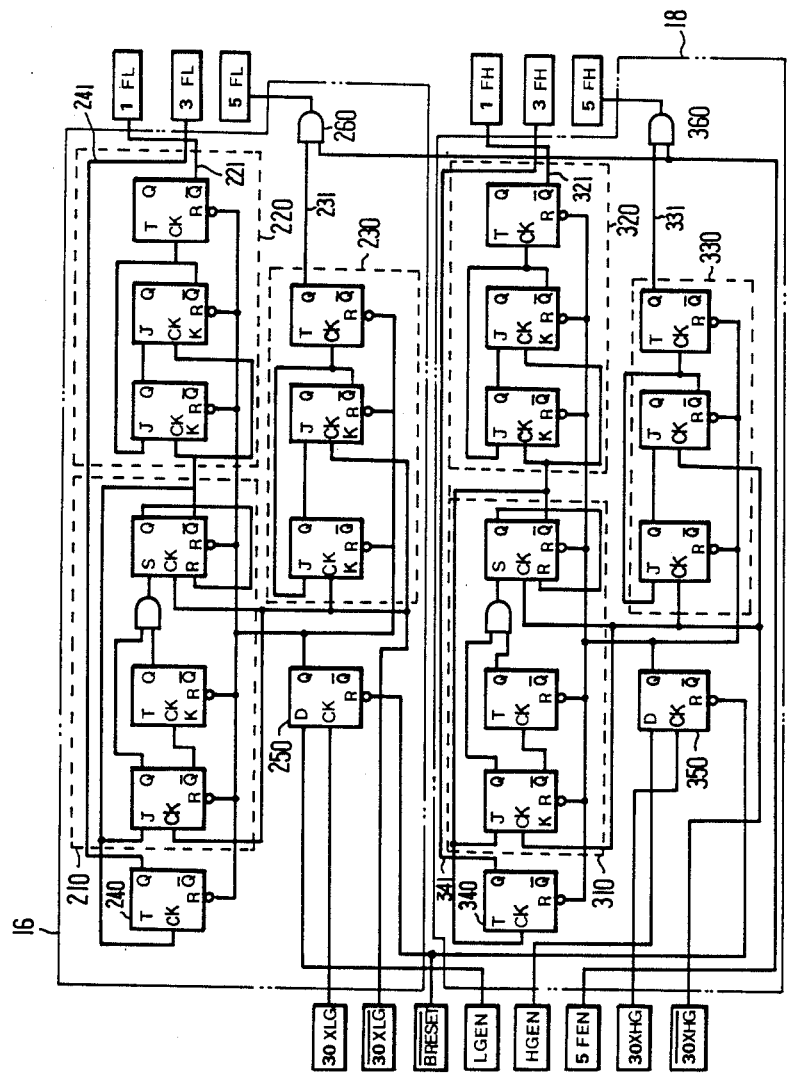
FIG. 5 specifically illustrates a preferred embodiment of the first and the second clock generators of FIG. 1.
Figure 6:
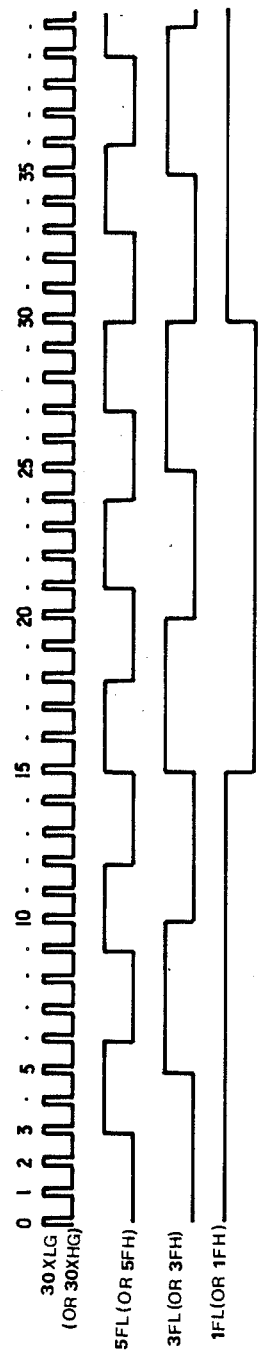
FIG. 6 is a timing diagram for illustrating the waveforms of the input and output digital signals of FIG. 5.

FIG. 5 specifically illustrates a preferred embodiment the first and the second clock pulse generating circuits of FIG. 1, and FIG. 6 is a schematic diagram for illustrating the timing of the input and output waveform of FIG. 5. The first clock pulse generating circuit 16 comprises the circuits for dividing by 30, 10 and 6 times each of a series of clock pulse signals $\overline{30XLG}$ from the frequency dividing circuit 12 of the low-frequency group, and means for enabling or disabling the frequency dividing circuits. Likewise, the second clock pulse generating circuit 18 comprises the circuits for dividing by 30, 10 and 6 each of a series of clock pulse signals $\overline{30XHG}$ from the frequency dividing circuit 12 of the high-frequency group, and means for enabling or disabling the frequency dividing circuits.

The clock pulse signals $\overline{30XLG}$ and $\overline{30XHG}$ are respectively coupled to modulo-6 frequency dividing circuits 230 and 330 for each generating the clock pulses having the duty cycle of 50% which are frequencies of the fifth-higher-harmonic wave, and each output of the circuit 230 and 330 is inputted to the two-input AND gates 260 and 360 together with the fifth-higher-harmonic wave control signal 5FEN. Hence, when the control signal 5FEN is in the high state, the outputs of the AND gates 260 and 360 are same as those of the modulo-6 frequency dividing circuits 230 and 330, respectively. Alternatively, if the control signal 5FEN is in the low state, the outputs of the AND gates 260 and 360 are both in the low state. The frequency of the signal $\overline{30XLG}$ is divided by a modulo-10 frequency dividing circuit comprising a modulo-2 frequency dividing circuit 240 connected in series with a modulo-5 frequency dividing circuit 210, which outputs to a conductor 241 a clock pulse 3FL having the duty cycle of 50% which is the frequency of the third-higher-harmonic wave. Likewise, the modulo-10 frequency dividing circuit comprising a modulo-5 frequency dividing circuit 310 and a modulo-2 frequency dividing circuit 340 divides the frequency of the signal $\overline{30XHG}$ by the number of 10 and outputs to a conductor 341 a clock pulse 3FH having the duty cycle of 50% which is the frequency of the third-higher-harmonic wave. Also, the frequency of the signal $\overline{30XLG}$ is divided by the number 30 by the modulo-6 frequency dividing circuit 220 connected in series with the modulo-5 frequency dividing circuit 210 which outputs the inverted clock pulse 1Fl to a conductor 221. Likewise, the frequency of the signal $\overline{30XHG}$ is divided by the number 30 by the modulo-6 frequency dividing circuit 320 connected in series with the modulo-5 frequency dividing circuit 310, which outputs the inverted clock pulse 1FH to a conductor 321. The signal 1FL is the clock pulse having the duty cycle of 50% whose frequency is same as one of the frequencies of the low-frequency group, and the signal 1FH is the clock pulse having the duty cycle of 50% whose frequency is the same as one of the frequencies of the high-frequency group. The above-frequency dividing circuits are all conventional in the art.

On the other hand, the flip-flops 250 and 350 are reset when the reset signal BRESET is in the low state, and disable the frequency dividing operation of the first and the second clock pulse generating circuits 16 and 18. However, if the reset signal BRESET is in the high state, the D-type flip-flops 250 and 350 enable or disable the above frequency dividing circuits by clocking the low-frequency group enabling signal LGEN and the high-frequency group enabling signal HGEN with clock pulses 30XLG and 30XHG. According to the preferred emboidiment of the present invention, when the clock pulse 30XLG enters into the high state from the low state, the low state of the low-frequency group enabling signal 30XLG disables said frequency circuits 210,220,230 and 240, and the high state of the signal 30XLG enables said frequency dividing circuits. Likewise, when the clock pulse 30XHG enters into the high state from the low state, the low state of the high-frequency group enabling signal 30XHG disables the frequency dividing circuits 310, 320, 330 and 340, and the high state of the signal 30XHG enables said frequency dividing circuits.

Hence, if the dialing keys on the keyboard are put on, and the signal 5FEN is in the high state, all the first and the second clock pulse generating circuits 16 and 18 can be operated, the clock pulses 1FL, 3FL and 5FL are produced which are odd multiples of a corresponding frequency from the low-frequency group, and the clock pulses 1FH and 3FH and 5FH are produced which are odd multiples of the corresponding frequency from the high-frequency group. When the output of the high-tone signal is required, the first clock pulse generating circuit 16 is disabled, and the second clock pulse generating circuit 18 outputs the clock pulses 1FH, 3FH and 5FH which are odd multiples of the frequency of the high-tone signal. When the output of the low-tone signal is required, the second clock pulse generating circuit 18 disabled, and the first clock pulse generating circuit 16 outputs the clock pluses which are odd multiples of the frequency of the low-tone signal.

Figure 7:
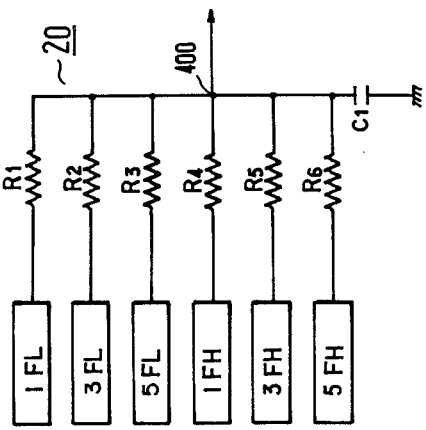
FIG. 7 specifically illustrates a preferred embodiment of the signal synthesizing circuit of FIG. 1.

FIG. 7 specifically illustrates a preferred embodiment of the signal synthesizing circuit of FIG. 1. The clock pulses 1FL, 3FL, 5FL, 1FH, 3FH and 5FH are respectively connected with the resistors R1-R6, which are connected in common with the output node 400. Between the output node 400 and ground is connected a capacitor C1. Hence, the signal synthesizing circuit 20 is a low-pass filter with a single pole, and is designed so as to bypass the component of the seventh-higher-harmonic wave. The resistors R1-R3 have the same values as the resistors R4-R6, respectively.

Assuming that the frequency of the clock pulse 1FL (or 1FH) in FIG. 6 is f0, and the magnitude of 1FL(or 1FH), 3FL(or 3FH), and 5FL(or 5FH) is A, the Fourier transformations f0(t), f3(t) and f5(t) of 1FL(or 1FH), 3FL(or 3FH), and 5FL(or 5FH) are respectively as follows:

$$f0(t) = \frac{A}{2} + \frac{2A}{\pi}\left(\cos 2\pi f0t - \frac{1}{3}\cos 2\pi \cdot 3f0t + \frac{1}{5}\cos 2\pi \cdot 5f0t - \frac{1}{7}\cos 2\pi \cdot 7f0t + \ldots\right) \quad (1)$$

$$f3(t) = \frac{A}{2} + \frac{2A}{\pi}\left(\cos 2\pi \cdot 3f0t - \frac{1}{3}\cos 2\pi \cdot 9f0t + \frac{1}{5}\cos 2\pi \cdot 15f0t - \ldots\right) \quad (2)$$

$$f5(t) = \frac{A}{2} + \frac{2A}{\pi}\left(-\cos 2\pi \cdot 5f0t + \frac{1}{3}\cos 2\pi \cdot 15f0t - \ldots\right) \quad (3)$$

From the above Equations (1) to (3) the following equation can be obtained.

$$f0(t) + \frac{1}{3} f3(t) + \frac{1}{5} f5(t) = \frac{23}{30} A + \frac{2A}{\pi} \left( \cos 2\pi f 0 t - \right.$$
$$\left. \frac{1}{7} \cos 2\pi \cdot 7 f 0 t - \frac{1}{11} \cos 2\pi \cdot 11 f 0 t + \ldots \right) \quad (4)$$

Therefore, [f0(t)+⅓f3(t)+1/5f5(t)] in equation (4) has the f0 component of the fundamental frequency, and the components of the third-higher-harmonic wave 3f0 and the fifth higher harmonic wave 5f0 are eliminated thereform. Moreover, the odd higher harmonic waves exceeding the seventh-higher-harmonic wave have a magnitude smaller than that of the fundamental wave, and these higher-harmonic waves can be bypassed through the capacitor C1. Therefore, if the values of the resistors R1–R3 are set so that R1:R2:R3 is 1:3:5, the analog sine wave that is rid of a components of the third and the fifth-higher-harmonic waves can be obtained at the output node 400.

On the other hand, the circuit of the present invention has the advantage that the high-tone and the low-tone can be adjusted by controlling a logic state of the fifth-higher-harmonic wave generating data BDG with the proper timing. As described above, since the fifth-higher-harmonic wave control signal 5FEN is in the high state when the fifth-higher-harmonic wave generating data BDG is in the high state, the sine wave signal of the high-tone or the low-tone without the fifth-higher-harmonic wave component can be obtained, while the sine wave of the high-tone or the low-tone mixed with the fifth-higher-harmonic wave component can be obtained by the low-state outputs of the AND gates 260 and 360 when the fifth-higher-harmonic wave generating data BDG are in the low state.

The frequency precision of the DTMF signal and the high/low-tone signals according to the present invention is shown in a following Table No. 2.

TABLE NO. 2

| Signal Group | Nominal Frequency | Output Frequency of the Invention | Deviation (%) | Remarks |
|---|---|---|---|---|
| High-Frequency | 1150 Hz | 1153 Hz | 0.26 | Group Signal |
| Group | 1209 Hz | 1201 Hz | −0.66 | DTMF Signal |
|  | 1336 Hz | 1333 Hz | −0.22 | " |
|  | 1477 Hz | 1471 Hz | −0.41 | " |
| Low-Frequency | 697 Hz | 699 Hz | 0.28 | " |
| Group | 770 Hz | 769 Hz | −0.13 | Low-tone Signal |
|  | 852 Hz | 853 Hz | 0.12 | DTMF Signal |
|  | 941 Hz | 938 Hz | −0.32 | " |

As apparent from the aforementioned description, the present invention has the advantages that the DTMF signal and the high/low-tone signal can be generated within 1% to tolerance of the nominal frequency by using the master clock used in the vehicle radio phone system, the higher-harmonic wave component can be eliminated, and the quality of high/low-tone can be efficiently adjusted.

While the invention has been particualrly shown and described with reference to a preferred embodiment, it will be understood by those skilled in the art that modifications in detail may be made without departing from the spirit and scope of the invention.

What is claimed is:

1. A circuit for generating dual-tone multi-frequency and high/low-tone signals from digital data, comprising:

a signal controlling logic circuit for decoding the digital data, in response to a digital control signal, to generate a plurality of low-frequency selecting decoding signals for selecting the frequency of a low-frequency group, a plurality of high-frequency selecting decoding signals for selecting the frequency of a high-frequency group, a low-frequency group enabling signal and a high-frequency group enabling signal;

a circuit means for generating first clock pulses exhibiting a fixed frequency;

a low frequency dividing circuit for generating second clock pulses having a second frequency of a fixed multiple of a particular frequency selected from said low-frequency selecting decoding signals by counting and decoding said first clock pulses;

a high frequency dividing circuit for generating third clock pulses having a third frequency of a fixed multiple of a particular frequency selected from said high-frequency selecting decoding signals by counting and decoding said first clock pulses;

first clock means, enabled by said low-frequency group enabling signal, for generating a plurality of fourth pulses having a duty cycle of 50% through division of said second clock pulses, said fourth pulses having an odd frequency component of a higher-harmonic wave;

second clock means, enabled by said high-frequency group enabling signal, for generating a plurality of fifth pulses having a duty cycle of 50% through division of said third clock pulses, said fifth pulses having an odd frequency component of a higher-harmonic wave; and a signal synthesizing circuit coupled to said first and second clock means, for synthesizing dual-tone multi-frequency signals to eliminate said odd frequency higher-harmonic wave components of said fourth and fifth pulses upon reception of said fourth and fifth clock pulses.

2. A circuit as claimed in claim 1, wherein said first clock pulse provided by said circuit for generating said first fixed clock pulse has a frequency nearly adjacent to a common multiple of the dual-tone multi-frequency signals frequency-divided by a master clock.

3. A circuit as claimed in claim 1, wherein said fourth and fifth clock pulses are higher-harmonic wave clock pulses of odd frequency comprising a clock pulse of a fundamental wave frequency, a clock pulse of a third-higher-harmonic of the fundamental wave frequency and a clock pulse of a fifth-higher-harmonic of the fundamental wave frequency, and said multiple being substantially an integer of thirty.

4. A circuit as claimed in claim 3, wherein the digital data includes information for generating said fifth-higher-harmonic wave, and means for controlling the generation of said fifth-higher-harmonic wave.

5. A circuit as claimed in claim 3, wherein said signal synthesizing circuit comprises a low-pass filter having a capacitor connected between an output node and a reference potential, and a plurality of resistors connected between said output node and each of the input terminals of said third and fourth clock pulses of said fundamental wave frequency, third higher-harmonic wave frequency, and fifth higher-harmonic wave frequency of said fourth and fifth pulses.

6. A circuit as claimed in claim 5, wherein said low-pass filter bypasses the frequency component of a seventh-higher-harmonic wave.

7. A circuit as claimed in claim 2, wherein said fourth and fifth pulses are higher-harmonic wave clock pulses of odd frequency comprising a clock pulse of a fundamental wave frequency, a clock pulse of a third-higher-harmonic of the fundamental wave frequency and a clock pulse of a fifth-higher-harmonic of the fundamental wave frequency, and multiple being substantially an integer of 30.

8. A circuit as claimed in claim 7, wherein the digital data includes information for generating said fifth-higher-harmonic wave, and means for controlling the generation of said fifth-higher-harmonic wave.

9. A circuit as claimed in claim 8, wherein said signal synthesizing circuit comprises a low-pass filter having a capacitor connected betweeen an output node and a reference potential, and a plurality of resistors connected between said output node and each of the input terminals of said third and fourth clock pulses of said fundamental wave frequency, third higher-harmonic wave frequency, and fifth higher-harmonic wave frequency of said fourth and fifth pulses.

10. A circuit as claimed in claim 9, wherein said low-pass filter bypasses the frequency component of a seventh-higher-harmonic wave.

11. A circuit for generating dual-tone multi-frequency and high/low-tone signals from digital data, comprising:
  signal controlling logic means for decoding the digital data, in response to a digital control signal, to generate a plurality of signals;
  means for generating a first fixed clock pulse;
  low frequency dividing means for generating second clock pulses from first signals generated by said signal controlling logic circuit by counting and decoding said first clock pusles;
  high frequency dividing means for generating third clock pulses from second signals generated by said signal controlling logic circuit by counting and decoding said first clock pulses;
  first clock generating means, enabled by a third signal generating means by said signal controlling logic circuit, for generating a plurality of fourth pulses through division of said second clock pulses of said low frequency dividing circuit, and said fourth pulses having an odd frequency component of a higher-harmonic wave;
  second clock generating means, enabled by a fourth signal generated by said signal controlling logic circuit, for generating a plurality of fifth pulses through division of said third clock pulses of said high frequency dividing circuit, and said fifth pulses having an odd frequency component of a higher-harmonic wave; and
  signal synthesizing means couple to said first and second clock means, for synthesizing the dual-tone multi-frequency signals upon reception of said fourth and fifth clock pulses genrated by said first and second clock generators to eliminate said odd frequency higher harmonic wave components.

12. A circuit as claimed in·claim 11, wherein said first signals, generated by said signal controlling logic circuit, are a plurality of low-frequency selecting decoding signals for selecting the frequency of a low-frequency group or low-tone.

13. A circuit as claimed in claim 12, wherein said second signals, generated by said signal controlling logic circuit, are a plurality of high-frequency selecting decoding signals for selecting the frequency of a high-frequency group or high-tone.

14. A circuit as claimed in claim 13, wherein said third signal, generated by said signal controlling logic circuit, is a low-frequency group enabling signal for enabling said first clock generator and said fourth signal, generated by said signal controlling logic circuit, is a high-frequency group enabling signal for enabling said second clock generator.

15. A circuit as claimed in claim 14, wherein said second pulses generated by said low-frequency dividing circuit have the frequency of a fixed multiple of a particular frequency selected from said low-frequency selecting decoding signals.

16. A circuit as claimed in claim 15, wherein said third pulses generated by said high-frequency dividing circuit have the frequency of a fixed multiple of a particular frequency selected from said high-frequency selecting decoding signals.

17. A circuit as claimed in claim 16, wherein said first clock pulse has a frequency close in value to a common multiple of the dual-tone multi-frequency and high/-low-tone signals frequency-divided by a master clock.

18. A circuit as claimed in claim 17, wherein said fourth and fifth pulses are higher-harmonic wave clock pulses of odd frequency comprising a clock pulse of the fundamental wave frequency, a clock pulse of a third-higher-harmonic wave frequency and a clock pulse of a fifth-higher-harmonic wave frequency, and its multiple is substantially an integer of thirty.

19. A circuit as claimed in claim 18, wherein the digital data includes information for generating the fifth-higher-harmonic wave, and means for controlling the generation of said fifth-higher-harmonic wave.

20. A circuit as claimed in claim 19, wherein said signal synthesizing circuit comprises a low-pass filter having a capacitor connected between an output node and a reference node and a plurality of resistors connected between said output node and each input terminal of said fourth and fifth clock pulses of said fundamental wave frequency, third higher-harmonic wave frequency, and fifth higher-harmonic wave frequency of said fourth and fifth pulses.

21. A circuit as claimed in claim 20, wherein said low-pass filter bypasses frequency components of a seventh-higher-harmonic wave.

22. A method for generating dual-tone multi-frequency and high/low tone signals comprising the steps of:
  receiving data control signals and digital data through an input bus from a central processing unit;
  decoding the data signals to generate low-frequency selecting decoding signals, high-frequency selecting decoding signals, low-frequency group enabling signals and high-frequency group enabling signals;

generating first and second clock pulses from said low-frequency selecting decoding signals and said high-frequency selecting decoding signals, respectively;

dividing the frequency of said first pulse to generate third clock pulses upon enabling by said low-frequency group enabling signal and dividing the frequency of said second clock pulse in said second clock generator to generate fourth clock pulses upon enabling by said high-frequency group enabling signals; and;

attenuating the harmonics of said third and fourth pulses to produce said dual-tone multi-frequency signal or said high/low-tone signal.

23. A method as claimed in claim 22, wherein counting and decoding of fifth fixed clock pulses to produce said first and second clock pulses having a frequency of a fixed multiple of a particular frequency of said respective selecting decoding signals.

24. A circuit for generating dual-tone multi-frequency and high/low-tone signals from digital data, comprising:

input means for conducting input data, representing low frequency signals, high frequency signals, low frequency enable signals, high frequency enable signals, and fifth harmonic wave control signals, and control signals;

signal controlling logic for decoding said input data, in response to said first control signals, to generate a plurality of low-frequency selecting decoding signals for selecting the frequency of a low-frequency group, a plurality fo high-frequency selecting decoding signals for selecting the frequency of a high-frequency group, a low-frequency group enabling signal and a high-frequency group enabling signal;

circuit means for generating first clock pulses exhibiting a fixed frequency;

low frequency dividing means for generating second clock pulses having a second frequency of a fixed multiple of a particular frequency selected from said low-frequency selecting decoding signals by counting and decoding said first clock pulses;

high frequency dividing means for generating third clock pulses having a third frequency of a fixed multiple of a particular frequency selected from said high-frequency selecting decoding signals by counting and decoding said first clock pulses;

first clock means, enabled by said low-frequency group enabling signal, for generating a plurality of fourth pulses through division of said second clock pulses, said fourth pulses having an odd frequency component of a higher-harmonic wave;

second clock means, enabled by said high-frequency group enabling signal, for generating a plurality of fifth pulses through division of said third clock pulses, said fifth pulses havin an odd frequency component of a higher-harmonic wave; and a signal synthesizing circuit coupled to said first and second clock means, for synthesizing dual-tone multi-frequency signals to eliminate said odd frequency higher-harmonic wave components of said fourth and fifth pulses upon reception of said fourth and fifth clock pulses.

25. A circuit as claimed in claim 24, wherein said first clock pulse provided by said circuit for generating said first fixed clock pulse has a frequency nearly adjacent to a common multiple of the dual-tone multi-frequency signals frequency-divided by a master clock.

26. A circuit as claimed in claim 25, wherein said fourth and fifth clock pulses are higher-harmonic wave clock pulses of odd frequency comprising a clock pulse of a fundamental wave frequency, a clock pulse of a third-higher-harmonic of the fundamental wave frequency and a clock pulse of a fifth-higher-harmonic of the fundamental wave frequency, and said multiple being substantially an integer of thirty.

27. A circuit as claimed in claim 26, wherein the data includes information for generating said fifth-higher-harmonic wave, and means for controlling the generation of said fifth-higher-harmonic wave.

28. A circuit as claimed in claim 27, wherein said signal synthesizing circuit comprises a low-pass filter having a capacitor connected between an output node and a reference potential, and a plurality of resistors connected between said output node and each of the input terminals of said third and fourth clock pulses of said fundamental wave frequency, third highher-harmonic wave frequency, and fifth higher-harmonic wave frequency of said fourth and fifth pulses.

29. A circuit as claimed in claim 28, wherein said low-pass filter bypasses the frequency component of a seventh-higher-harmonic wave.

30. A circuit for generating dual-tone multi-frequency and high/low-tone signals from digital data, comprising:

input means for conducting input data and input control signals;

signal controlling logic means for decoding said input data, in response to said digital control signals, to generate a plurality of frequency selecting decoding signals;

circuit means for generating first clock pulses exhibiting a fixed frequency;

frequency dividing means for generating second clock pulses having a second frequency of a fixed multiple of a particular frequency selected from said frequency selecting decoding signals by counting and decoding said first clock pulses;

clock means for generating a plurality of third pulses through division of said second clock pulses, said third pulses having an odd frequency component of a higher-harmonic wave; and signal synthesizing means coupled to said clock means, for synthesizing dual-tone multi-frequency signals to eliminate said odd frequency higher-harmonic wave components of said third pulses upon reception of said third clock pulses.

* * * * *